(12) United States Patent
Bandyopadhyay et al.

(10) Patent No.: US 8,291,380 B2
(45) Date of Patent: Oct. 16, 2012

(54) METHODS FOR CONFIGURING SOFTWARE PACKAGE

(75) Inventors: Tirthankar Bandyopadhyay, Elmsford, NY (US); Kumar Bhaskaran, Englewood Cliffs, NJ (US); Rajesh Chopra, Union, NJ (US); Christina Derra, Düsseldorf (DE); Shiwa Fu, Chappaqua, NY (US); Ying Huang, Yorktown Heights, NY (US); Stephen K. Kibby, Carlsbard, CA (US); Santhosh Kumaran, Peekskill, NY (US); Igor A. Naumov, Plano, TX (US); Thomas D. Rosinski, Frisco, TX (US); Gerhard Sigl, Hudson, NH (US)

(73) Assignee: International Business Machines Corporation, Armonk, NY (US)

( * ) Notice: Subject to any disclaimer, the term of this patent is extended or adjusted under 35 U.S.C. 154(b) by 1260 days.

(21) Appl. No.: 12/042,529

(22) Filed: Mar. 5, 2008

(65) Prior Publication Data
US 2009/0228867 A1 Sep. 10, 2009

(51) Int. Cl.
*G06F 9/44* (2006.01)
(52) U.S. Cl. ....................................................... 717/121
(58) Field of Classification Search .................. 717/110, 717/113, 121
See application file for complete search history.

(56) References Cited

U.S. PATENT DOCUMENTS

| | | | |
|---|---|---|---|
| 6,311,192 B1 | 10/2001 | Rosenthal et al. | |
| 6,338,067 B1 | 1/2002 | Baker et al. | |
| 2003/0046140 A1* | 3/2003 | Callahan et al. | 705/10 |
| 2003/0126050 A1* | 7/2003 | Theiss et al. | 705/35 |
| 2003/0220843 A1 | 11/2003 | Lam et al. | |
| 2004/0088142 A1 | 5/2004 | Ashley et al. | |
| 2004/0199539 A1* | 10/2004 | Richardson et al. | 707/102 |
| 2006/0143194 A1 | 6/2006 | Stewart et al. | |
| 2006/0206366 A1 | 9/2006 | Habib et al. | |
| 2007/0078701 A1 | 4/2007 | Bliznak | |
| 2007/0089091 A1* | 4/2007 | Larab et al. | 717/124 |
| 2007/0198666 A1* | 8/2007 | Hoyes et al. | 709/220 |
| 2008/0288306 A1* | 11/2008 | MacIntyre et al. | 705/7 |

FOREIGN PATENT DOCUMENTS
EP 1383043 1/2004
* cited by examiner

*Primary Examiner* — Anna Deng
(74) *Attorney, Agent, or Firm* — Cahn & Samuels, LLP

(57) ABSTRACT

A method for configuring a software package for an enterprise includes gathering desired To-be configuration requirements for a software package through at least one questionnaire; gathering current As-Is raw data for the enterprise; displaying the To-Be configuration requirements and As-Is raw data; comparing the To-Be configuration requirements and As-Is raw data; selecting final To-Be configuration requirements; and generating and executing configuration code for the software package to pre-configure the software package with the final To-Be configuration requirements.

13 Claims, 15 Drawing Sheets

METHODS FOR CONFIGURING SOFTWARE PACKAGE

I. FIELD OF THE INVENTION

The present invention relates to a system and methods for the model-driven configuration of a software package for an enterprise.

II. BACKGROUND OF THE INVENTION

Configuration of software packages, such as SAP® R/3 enterprise resource software, is time consuming and labor intensive. For a large scale software deployment across an enterprise, a software package must be configured for a variety of sites, groups, or industries (e.g., chemical, pharmaceutical, consumer products, administration). Accordingly, configuration is costly, prone to errors, and requires an expert with strong application configuration knowledge. In addition, configuration of a software package is complicated when migrating legacy data and processes to the new software package. Thus, only a limited amount of enterprise data is taken into account.

U.S. Patent Application Publication US 2006/0206366 A1 discloses a method of displaying a process characterized by multiple process steps. The process comprises the step of displaying a first process flow representing the process in a flow chart format on a report, wherein the first process flow represents a first characterization of the process. A second process flow is displayed representing the process in a flow chart format adjacent the first process flow displayed on the report, wherein the second process flow represents a second characterization of the process that is different from the first characterization of the process.

U.S. Pat. No. 6,338,067 discloses a product hierarchy database that organizes company market performance and stock investment information by the products and services produced and offered by each competitor. The companies that produce each product/service are relationally linked to each of their products/services through records. An investment information service includes the product/service hierarchy database and makes it accessible to investor and analyst subscribers through a query system across the Internet. Data entry personnel continually load qualitative and quantitative information about companies and their products/services through a product hierarchy generator connected to the product/service hierarchy database. Subscribers can punch-through to query individual data items, and they can find out what relationships exist between all the important aspects of the companies and the products/services being tracked. The invention also provides for the creation of an index and corresponding index value for every product or service type in the database, which consists of a composite of all companies in a product or service area and whose index value can be measured and compared against any other product or service type index value.

There remains a need for model-driven methods and tools to ease the processes for configuration of a software package, in particular, to provide a large amount of enterprise-specific data and information, thereby allowing the development of a full configuration environment.

III. SUMMARY OF THE INVENTION

According to an aspect of the present invention, a method is provided for configuring a software package for an enterprise. Desired To-be configuration requirements for a software package are gathered through at least one questionnaire. Current As-Is raw data for the enterprise is gathered. The To-Be configuration requirements and As-Is raw data and displayed and compared. Final To-Be configuration requirements are selected. Configuration code is generated and executed for the software package to pre-configure the software package with the final To-Be configuration requirements.

In another aspect of the invention, a method is provided for configuring a software package for an enterprise. A meta-model is created and populated to describe an enterprise. Desired To-be configuration requirements for a software package are gathered through at least one questionnaire. Current As-Is raw data is gathered for the enterprise. The To-Be configuration requirements and As-Is raw data are compared against the meta-model. The To-Be configuration requirements and As-Is raw data are displayed. The To-Be configuration requirements and As-Is raw data are compared. Final To-Be configuration requirements are selected. Configuration code for the software package is generated and executed to pre-configure the software package with the final To-Be configuration requirements.

In another aspect of the invention, a method is provided for configuring a software package for an enterprise. A questionnaire template is created using a meta-model with an administrator tool. To-Be configuration requirements are gathered using a questionnaire template with an interview template tool.

In another aspect of the invention, a method is provided for configuring a software package. A meta-model is created and populated. To-be configuration requirements are gathered for a software package through at least one questionnaire. Current As-Is raw data is gathered. To-Be configuration requirements and As-Is raw data are displayed. To-Be configuration requirements and As-Is raw data are compared. Final To-Be configuration requirements are selected. Configuration code for the software package is automatically generated and executed to pre-configure the software package with the final To-Be configuration requirements.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the system and methods should become evident to a person of ordinary skill in the art.

IV. BRIEF DESCRIPTION OF THE DRAWINGS

FIG. 3 illustrates a screen from a questionnaire or wizard used in the method of FIG. 2.

FIG. 11 illustrates a screen for automatically displaying the business configuration set file from FIG. 9.

V. DETAILED DESCRIPTION OF THE DRAWINGS

FIGS. 1-15 illustrate a system and methods for model-driven configuration of a software package for an enterprise. The system and methods of the present invention reduce the costs and complexity of software package configuration. The system and methods also extends software package application functionalities; provide easy-to-scale configuration for projects; and lower the application configuration knowledge requirements for users.

Figure 1:
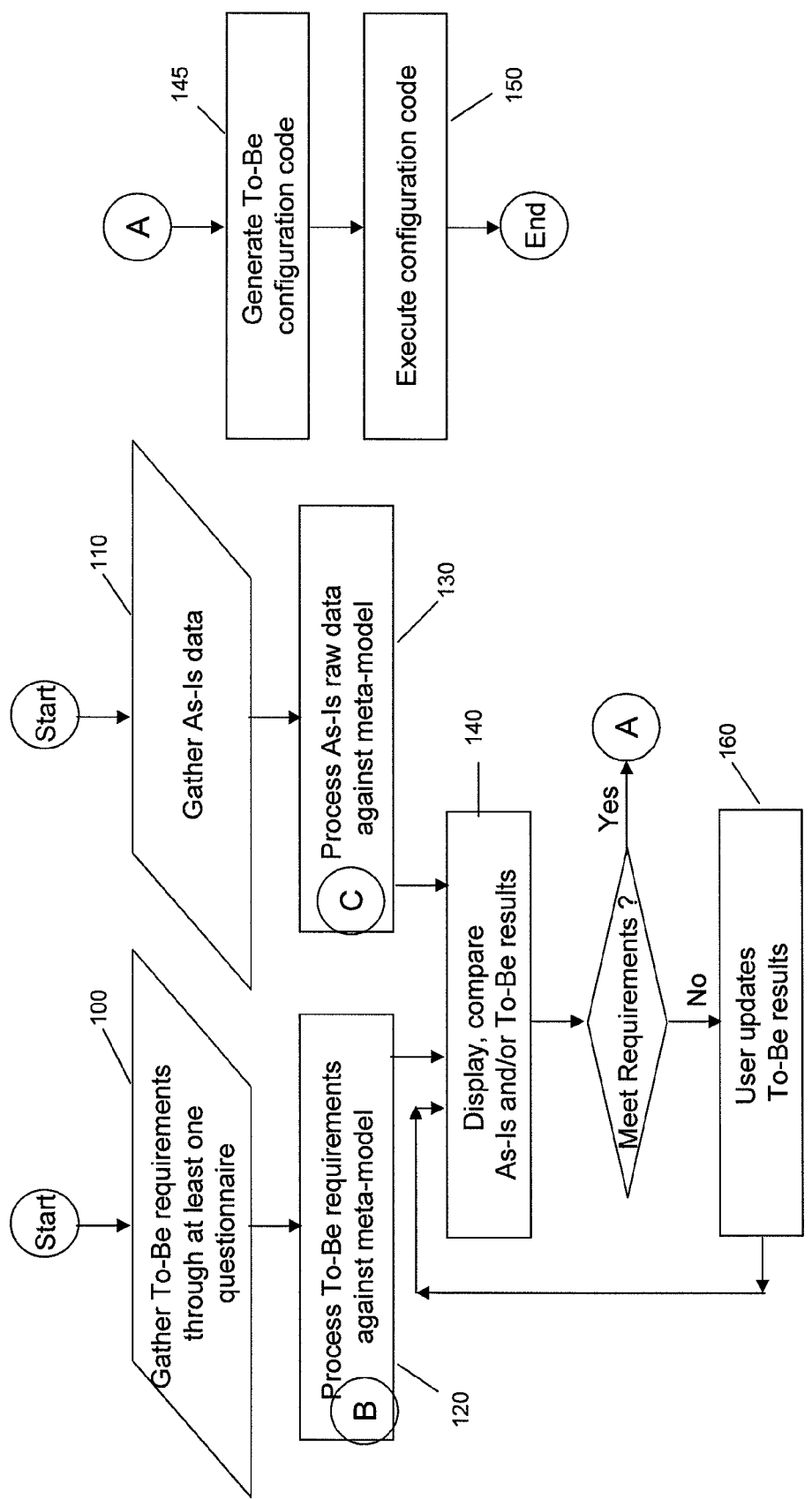
FIG. 1 illustrates a flowchart for a method for configuration of a software package according to an embodiment of the present invention.

FIG. 1 shows an overall flowchart of a method according to the present invention. A client's desired configuration requirements (To-Be requirements) are gathered through the use of at least one questionnaire or wizard, 100. Current configuration data (As-Is raw data) is also gathered, 110. Both the To-Be configuration requirements and the As-Is raw data are processed and compared against a meta-model, 120 and 130, respectively.

Figure 15:
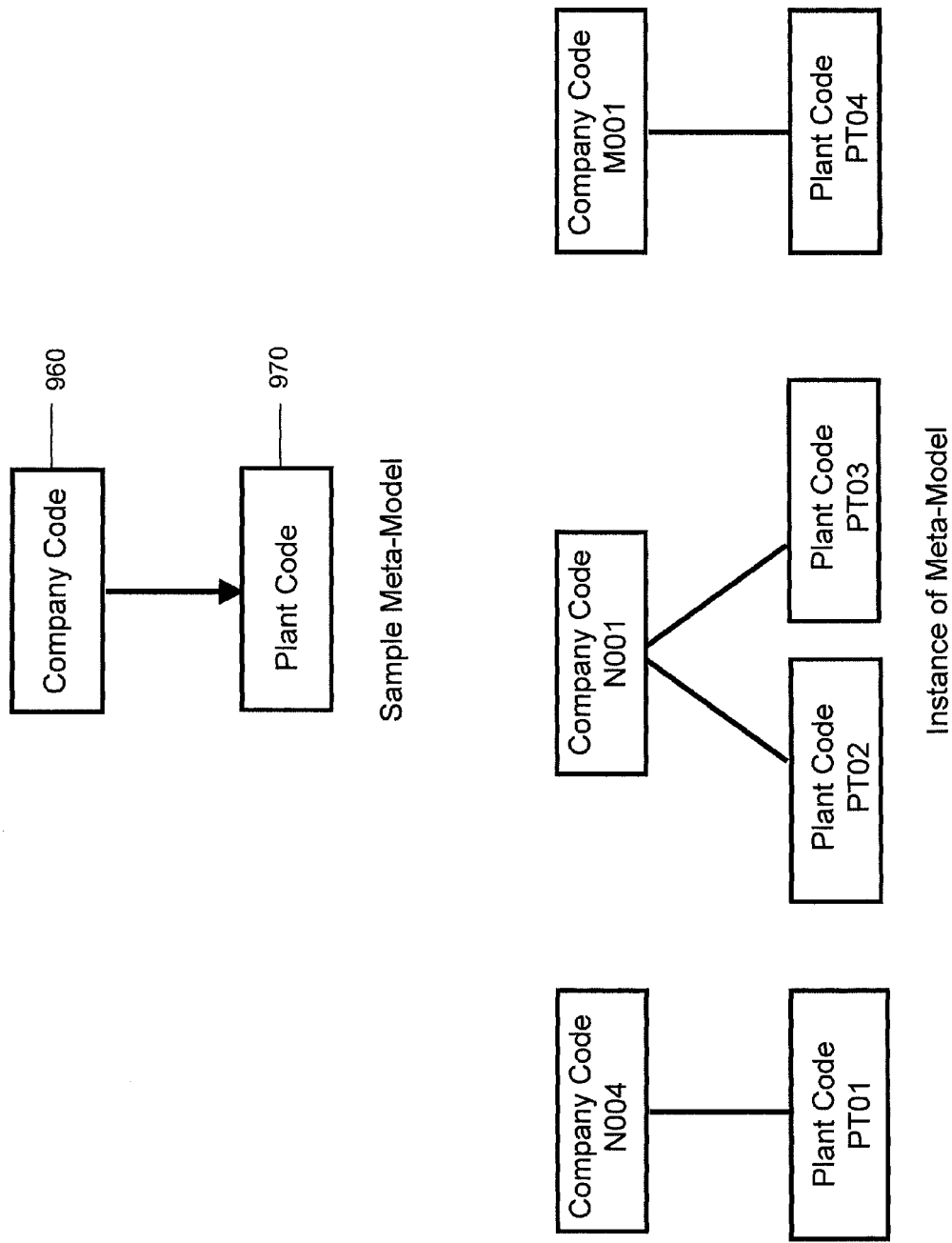
FIG. 15 illustrates a sample meta-model in contrast to As-Is data or To-Be configuration data as an instance of the meta-model.

A meta-model defines the structure of an enterprise organization. In embodiments, the meta-model may be created by at least one of a software package expert (e.g., an SAP® expert or consultant) or an information technology (IT) architect. The software expert provides business knowledge of organizational structure. The IT architect captures the business knowledge and knows how to implement various operating systems, databases, and computer systems, for example, using a meta-model creation tool. FIG. 15 illustrates a sample meta-model showing company code 960 and plant code 970 and specific instances of the meta-model for company code and plant code. The As-Is raw data and To-Be configuration requirements are an instance of the meta-model.

In embodiments, the meta-model comprises at least one of data, information, organization models, facts, relationships, or metrics used to describe an enterprise and its functions. The meta-model serves as a reference for the software configuration and preferably does not change or changes occasionally during the method of the present invention. The meta-model may be updated to reflect a change in a business or a new entity of an enterprise, for example, one or twice a year. In embodiments, the meta-model may be stored in a database.

In embodiments, at least one of a software expert or IT architect may develop the meta-model and create a questionnaire template from the meta-model. At least one questionnaire for a software package may be created based on the questionnaire template. A client or user of the software package provides input for the at least one questionnaire 100.

As shown in FIG. 1, during processing, 120 and 130, the To-Be configuration requirements collected from the at least one questionnaire and the As-Is raw data may be used to create at least one instance model which is compared against the meta-model. This comparison against the meta-model helps establish the differences between the To-Be configuration requirements and the As-Is raw data. The To-Be configuration requirements and As-Is raw data may be stored in the same database or a different database than the meta-model.

The To-Be configuration requirements and As-Is raw data are displayed and compared 140 in a graphical user interface, such as a computer screen or video screen. If the To-Be requirements are sufficient to configure the enterprise software package, code is generated to install the To-Be configuration requirements for the software package 145. The configuration code is then executed 150. If the To-Be requirements are not sufficient, the client or user may update the To-Be results manually or through changing answers in the at least one questionnaire 160. The model-drive software configuration is platform-independent up to the point at which configuration code (e.g., scripts) is generated and executed for a particular platform.

Figure 2:
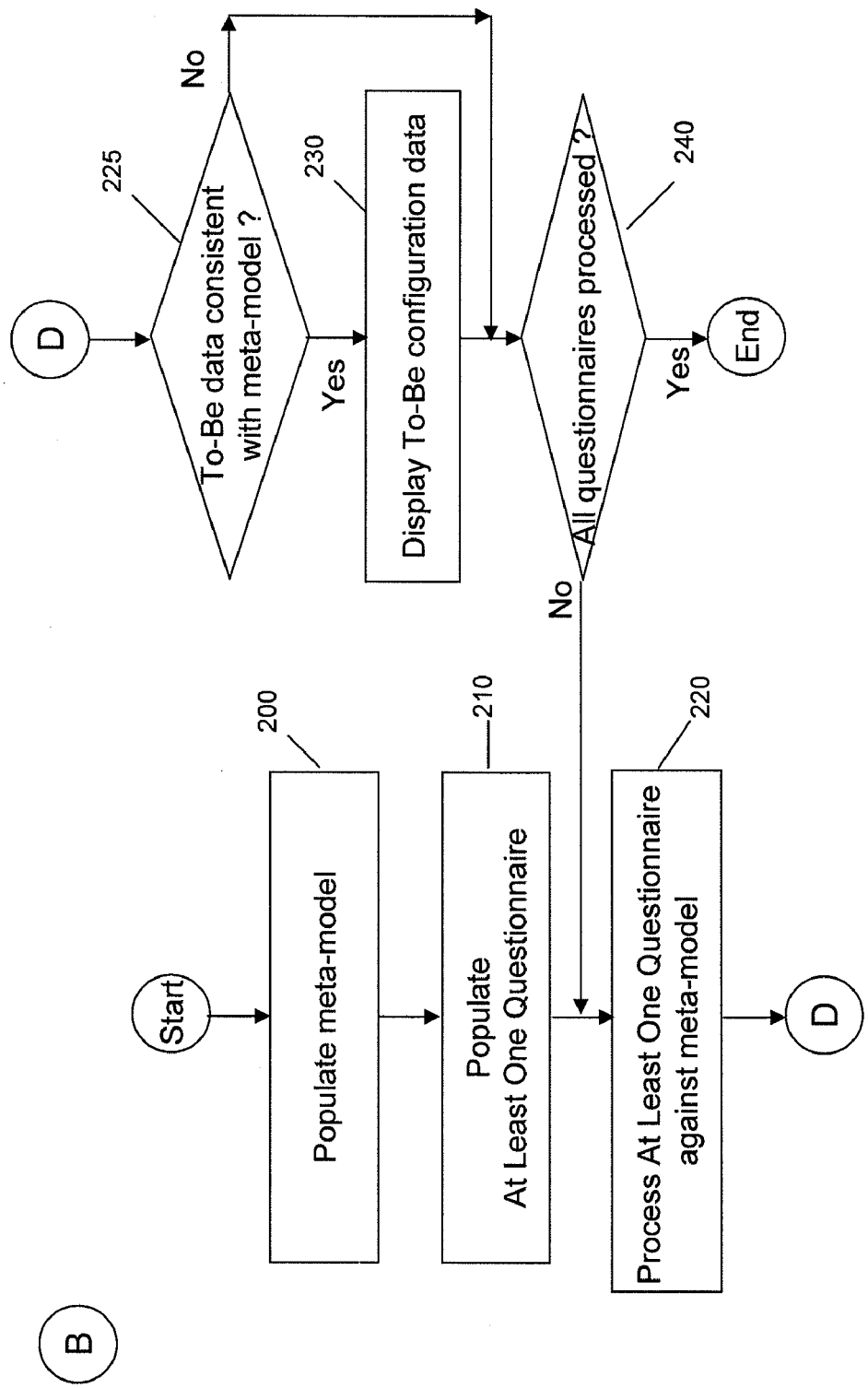
FIG. 2 illustrates a flowchart for processing To-Be configuration requirements (B) for the software configuration of FIG. 1.

As shown in FIG. 2, the desired To-Be configuration requirements are obtained using at least one questionnaire. The meta-model and corresponding mapping tables are retrieved and populated 200. The at least one questionnaire is processed by checking against the meta-model to populate the at least one questionnaire 210.

The at least one questionnaire comprises a series of questions for the deployment of a software package, such as an enterprise resource software package. The questions may be in any desired form, for example, yes/no questions, true/false questions, multiple choice questions, matching questions, and the like.

Figure 3:
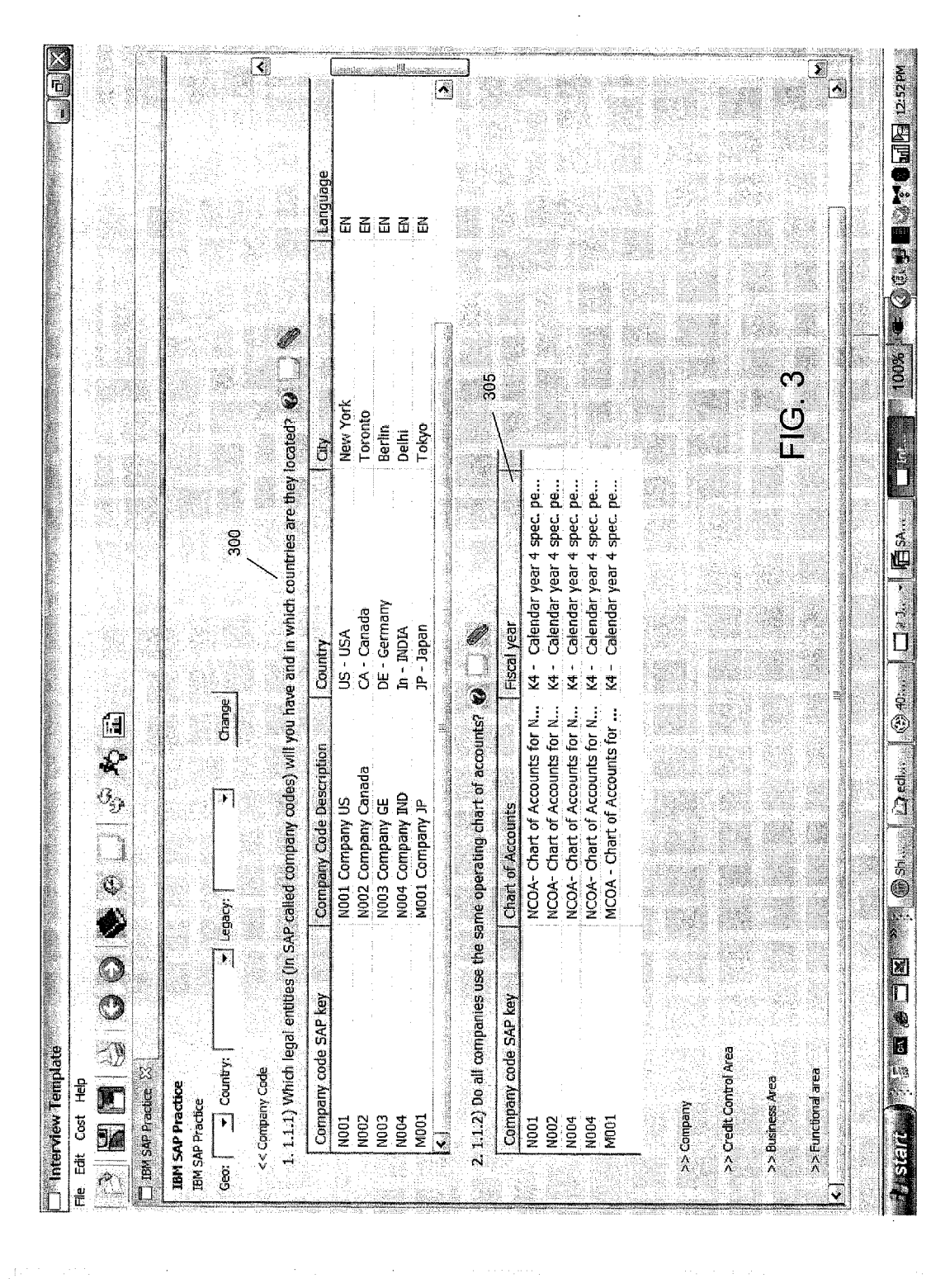
Figure 4:
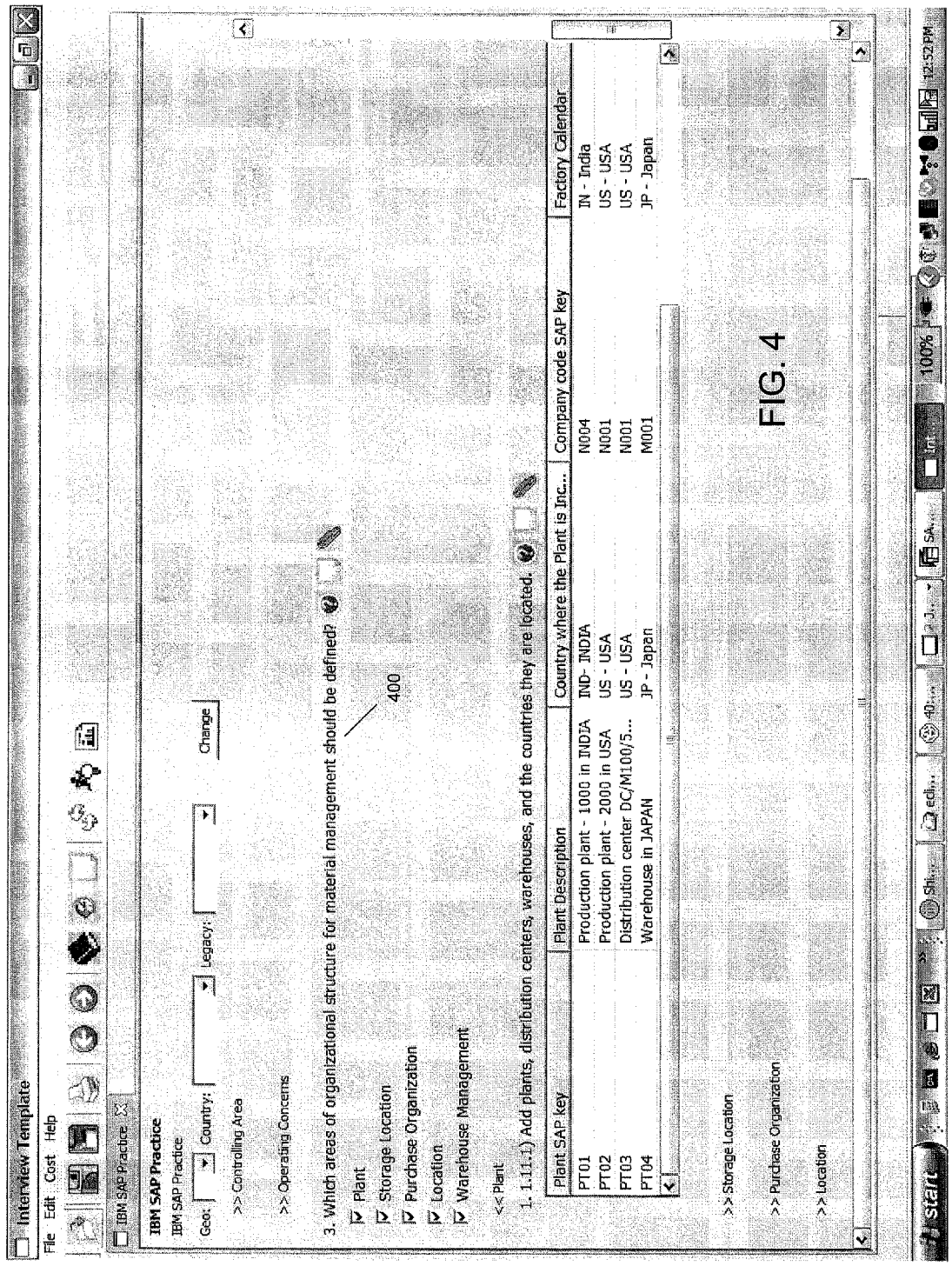
FIG. 4 illustrates a screen for a questionnaire or wizard used in the method of FIG. 2.
Figure 5:
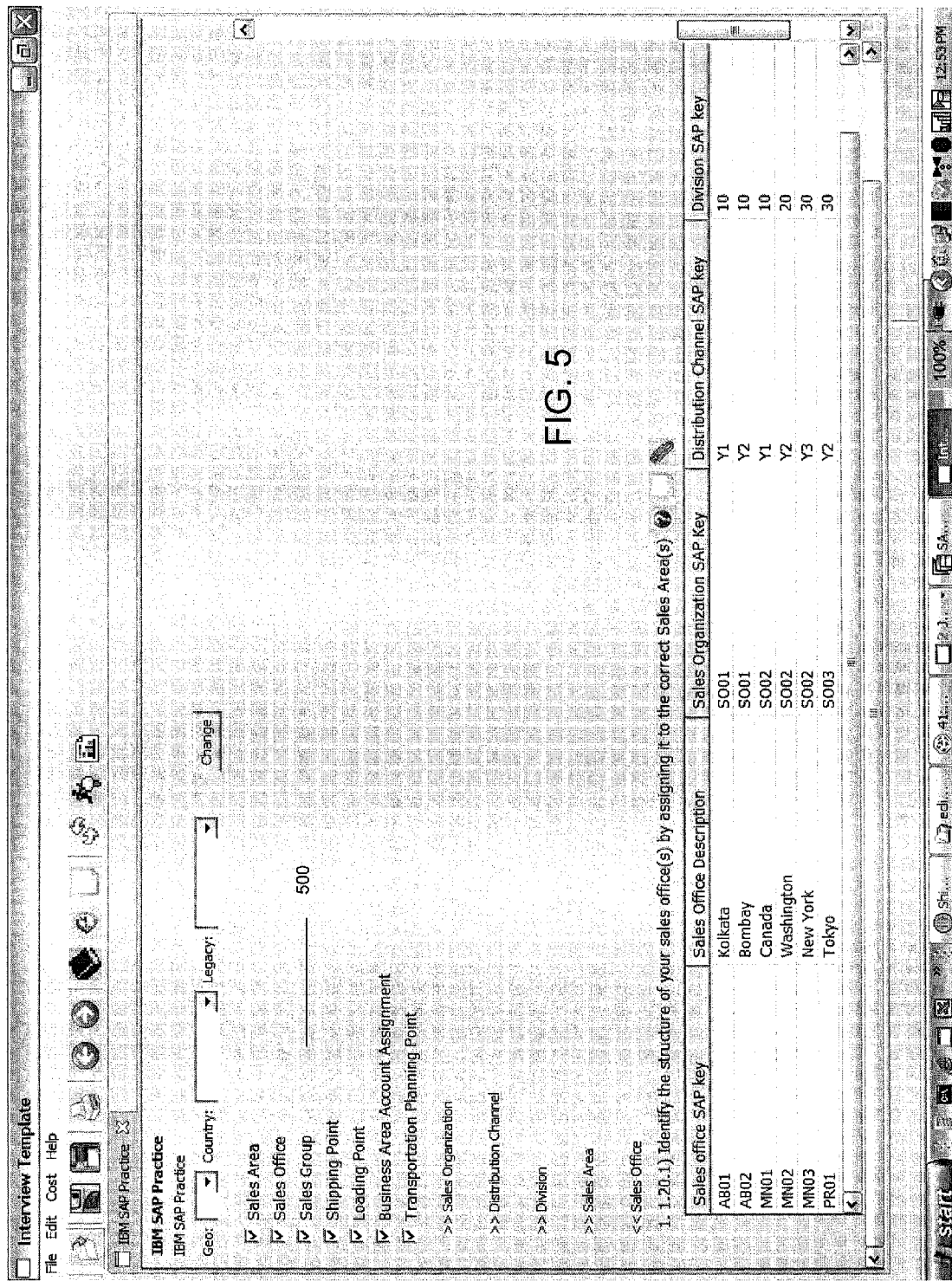
FIG. 5 illustrates a screen for a questionnaire or wizard used in the method of FIG. 2.

In embodiments, the at least one questionnaire or interview may comprise questions that include, but are not limited to, information about the geographic, legal or administrative organization of an enterprise 300 and about the financial organization of the enterprise 305 (e.g., accounts, credit, invoices, etc.), as illustrated in FIG. 3. The at least one questionnaire may comprise questions including information about the logistical organization of the enterprise 400 (e.g., plants, storage locations, purchase organizations, warehouse management), as illustrated in FIG. 4. The at least one questionnaire may comprise questions regarding information about the sales and communication organization of the enterprise 500 (e.g., sales area, sales office, sales group, shipping points, loading points, transportation planning, business area, distribution channel, divisions), as illustrated in FIG. 5. FIGS. 3-5 illustrate the at least one questionnaire as it may be used with a SAP® enterprise software package, but the questionnaire is not intended to be limited to any particular software package.

A client or user who plans for deployment of the software package provides inputs to answer the at least one questionnaire or wizard. The inputs are processed by checking them against the meta-model 220.

If inputs from the at least one questionnaire (e.g., nodes, information, data, relationships) are consistent with the meta-model, 225, the inputs establishing the To-Be configuration data are displayed 230. As noted in FIG. 1, the inputs from the at least one questionnaire (To-Be configuration requirements) are displayed and compared with the As-Is raw data. The method determines whether all questionnaires have been processed 240.

Figure 6:
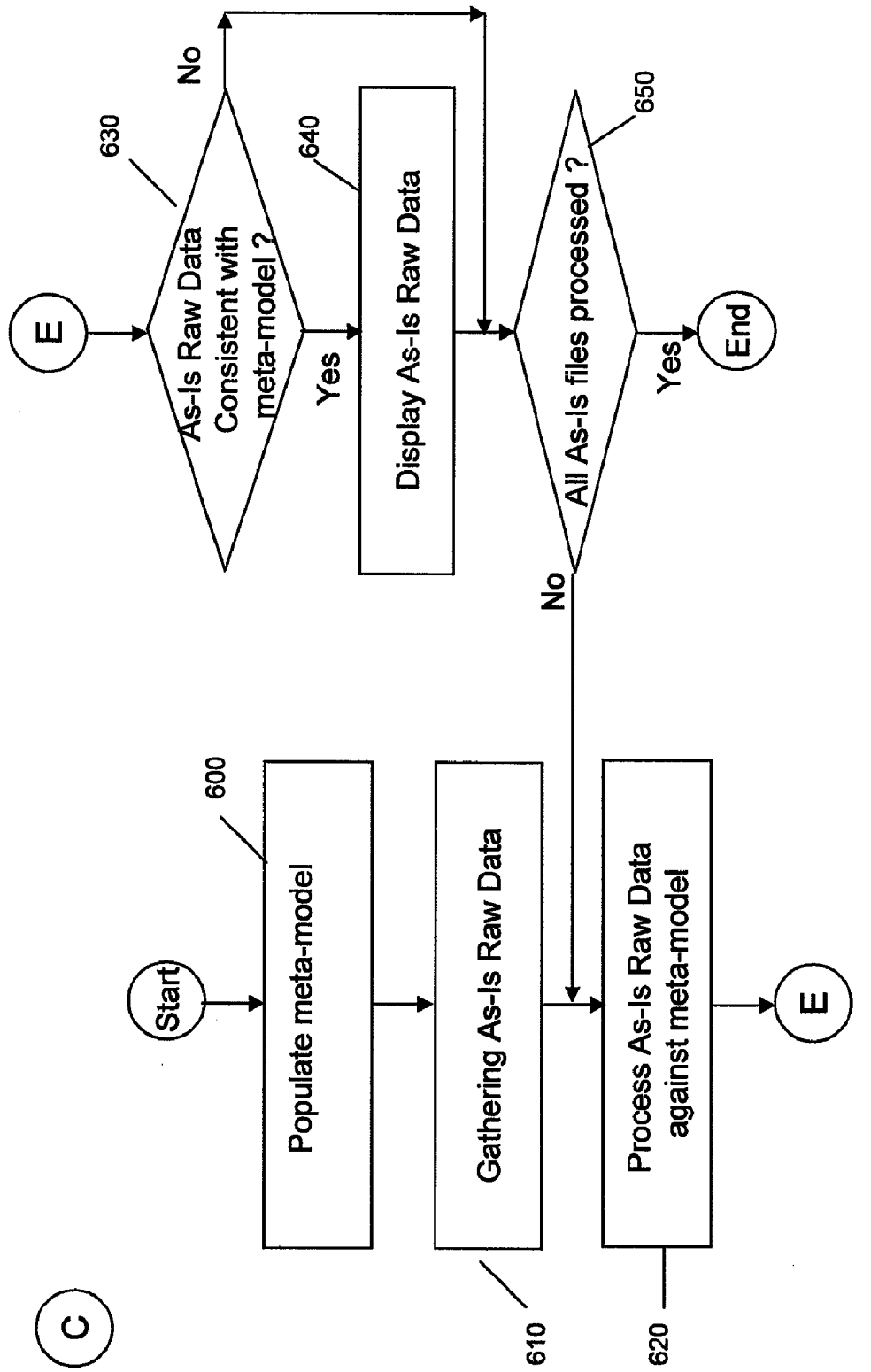
FIG. 6 illustrates a flowchart for processing As-Is configuration data (C) for the software configuration of FIG. 1.

According to the present invention, the current As-Is raw data or legacy configuration data are obtained, as illustrated in FIG. 6. As with FIG. 2, the meta-model and corresponding mapping tables are retrieved and populated, 600. In certain embodiments, the As-Is raw data may be obtained by traversing the hierarchy structure (e.g., traversing at least one IMG file), 610. The As-Is raw data is processed by checking against the meta-model 620.

If the As-Is raw data (e.g., nodes, information, data, relationships) are consistent with the meta-model, 630, the data is displayed, 640. In embodiments, a data conversion tool may allow for difficult cryptic names of files in the As-Is raw data to be converted or mapped to other names using the meta-model for easy display. As noted in FIG. 1, the As-Is raw data and the To-Be configuration requirements are displayed and compared. The method determines whether all As-Is raw data (e.g., all IMG files) have been processed 650.

Figure 7:
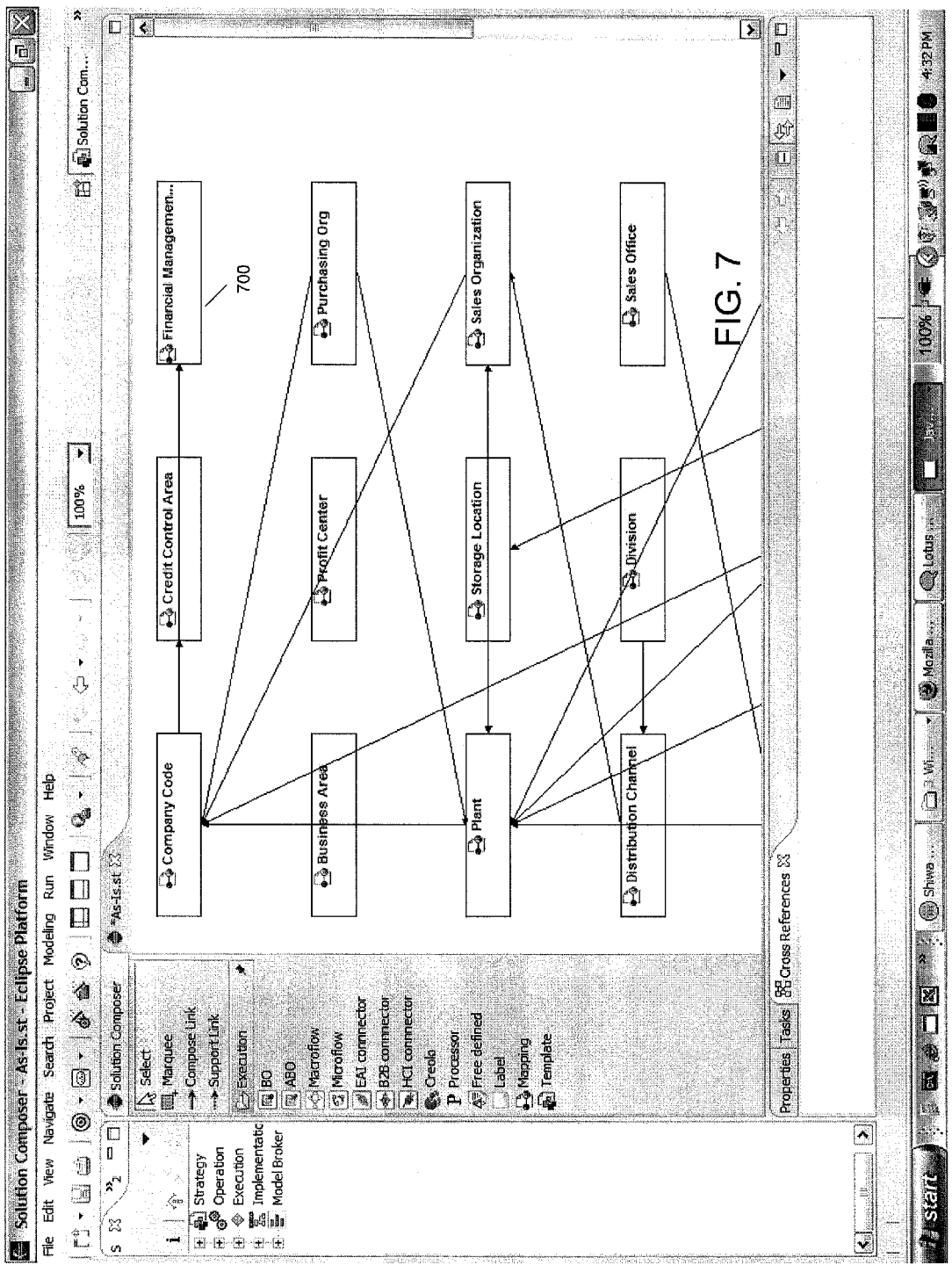
FIG. 7 illustrates a screen for displaying the As-Is configuration data obtained from FIG. 6.
Figure 8:
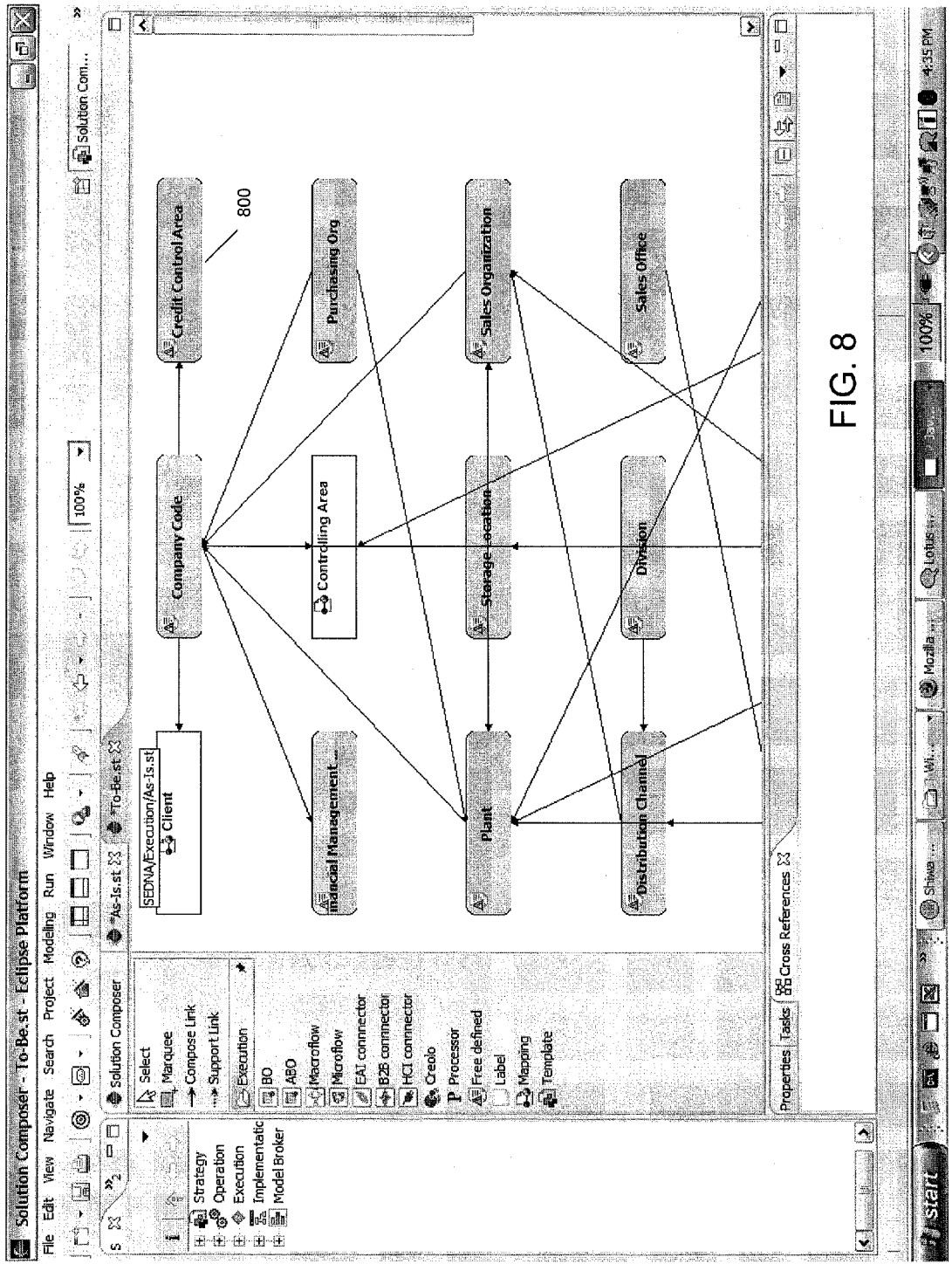
FIG. 8 illustrates a screen for comparing the To-Be configuration requirements and the As-Is configuration data.

The display and comparison of the As-Is raw data and the To-Be configuration requirements are illustrated in FIGS. 7-8. In certain embodiments, the As-Is raw data may be displayed graphically 700, as illustrated in FIG. 7. The To-Be configuration requirements obtained from the at least one questionnaire may be shown graphically and compared to the As-Is data, as shown in FIG. 8. Any differences between the To-Be configuration data and As-Is raw data may be highlighted 800. According to the present invention, a client or user may edit, modify, or update the To-Be configuration requirements in view of the comparison (160 in FIG. 1) and selects the final To-Be configuration requirements. Thus, in embodiments, final To-Be configuration requirements for a software package may be defined by merging the To-Be and As-Is configuration data.

According to the present invention, configuration code (e.g., scripts) is automatically generated based upon the desired final To-Be configuration requirements. At this point, the method of the present invention ceases to be platform-independent and becomes platform-specific based upon the target software package (e.g., SAP®, ORACLE®, IBM®). After the configuration code is executed, the software package is configured so that it may be activated in a target system.

Figure 9:
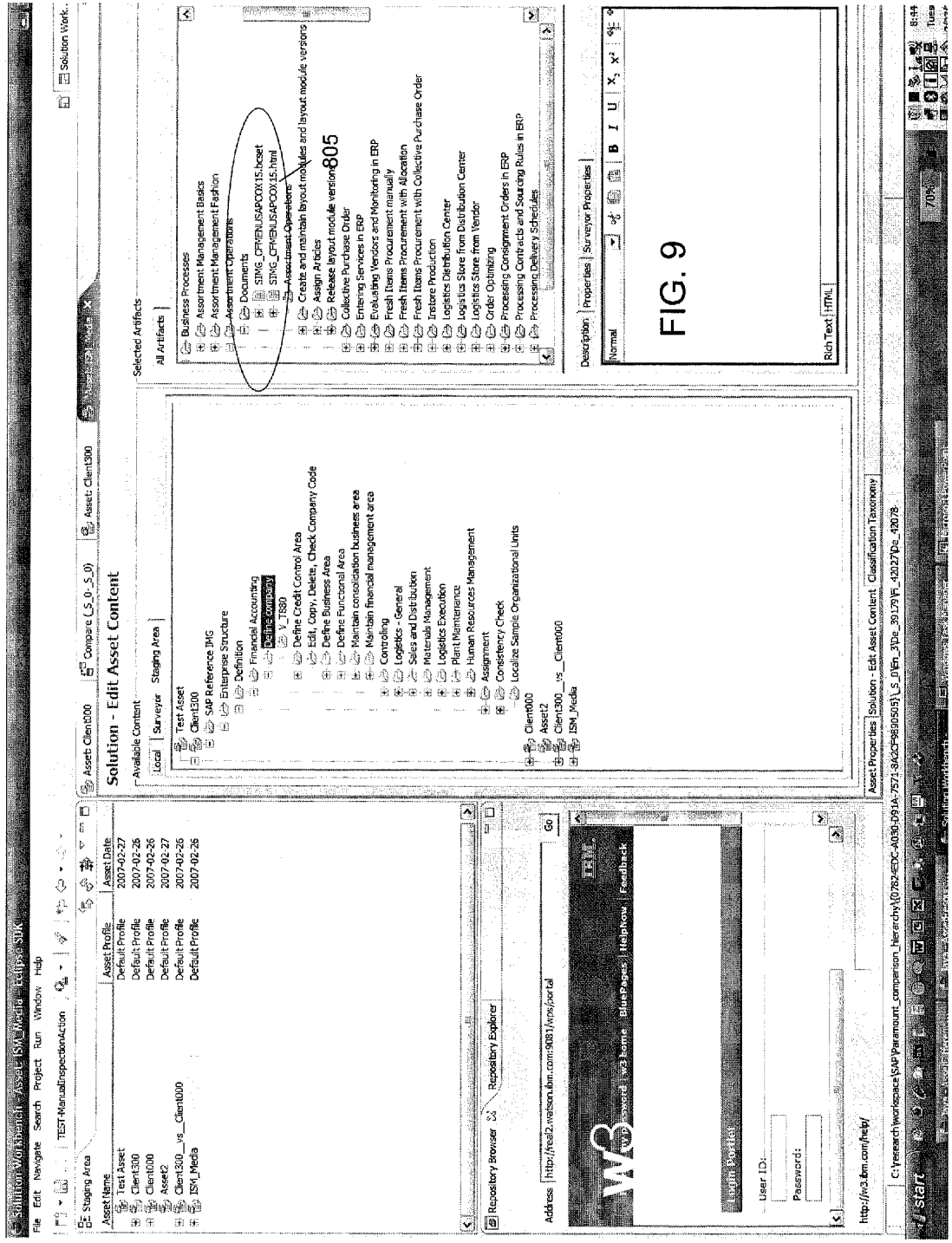
FIG. 9 illustrates a screen in which To-Be configuration requirements are dragged and dropped into a hierarchy structure of a software package to generate a business configuration set according to an embodiment of the present invention.
Figure 10:
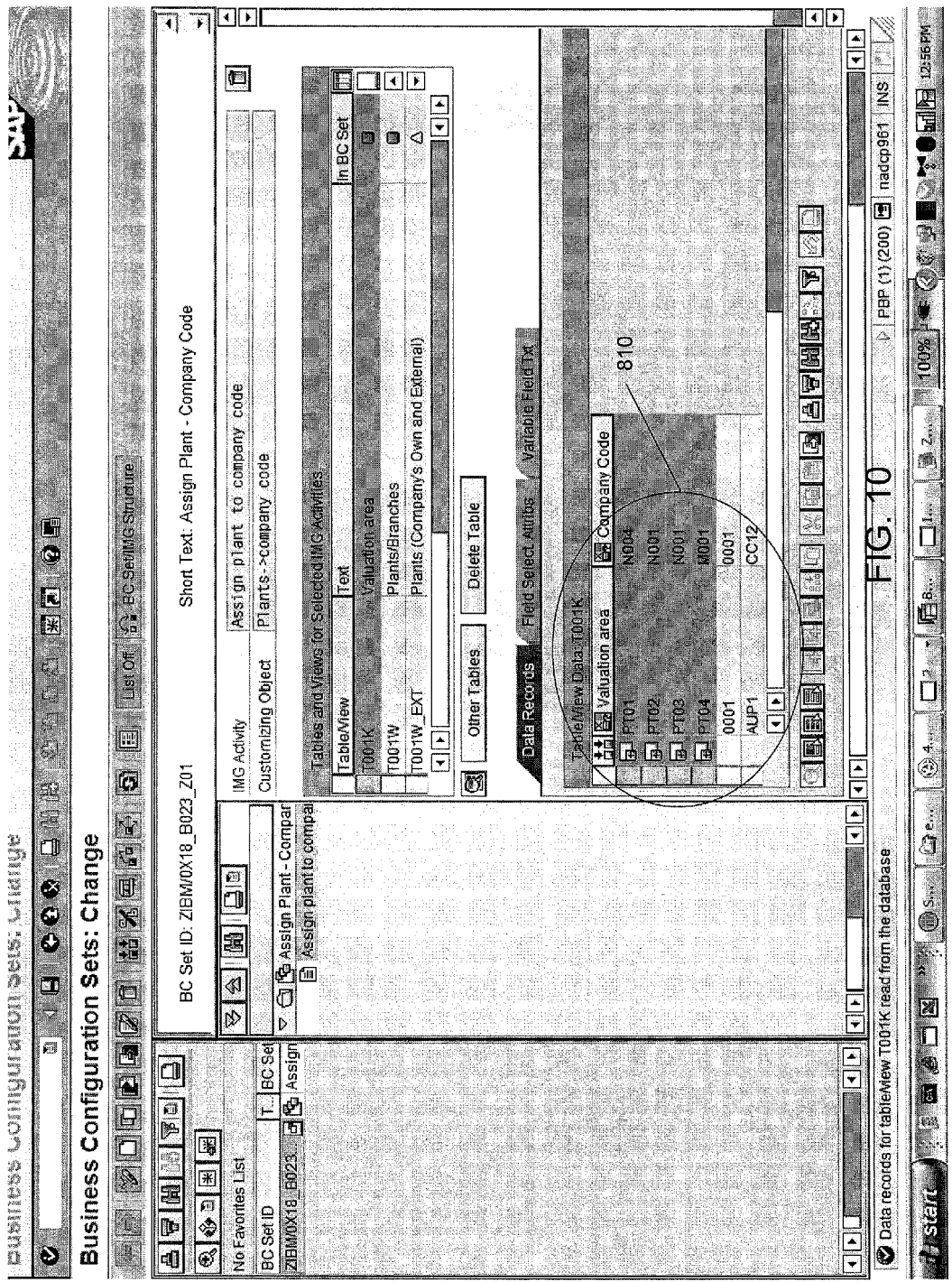
FIG. 10 illustrates a screen for loading into an SAP® system an enterprise hierarchy structure using the business configuration set from FIG. 9.
Figure 11:
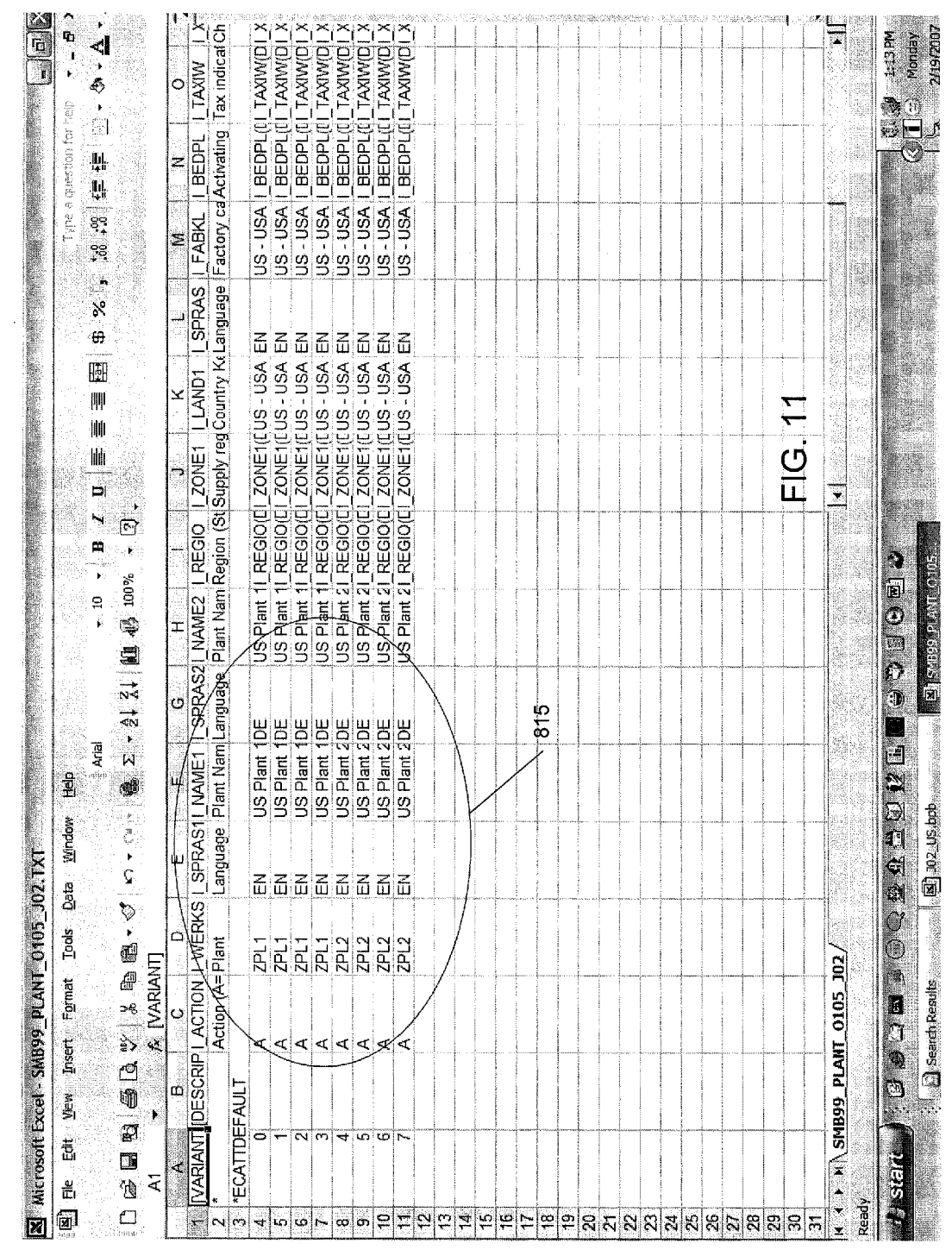

The generation of configuration code for To-Be configuration requirements may occur in different ways. As shown in FIG. 9, for example taking an SAP® product as the target software package, when the To-Be configuration requirements are represented as a hierarchy structure, at least one node from the To-Be configuration requirements may be dragged and dropped into the hierarchy structure of the software package 805 to generate Business Configuration Sets (BC sets). An entire organization hierarchy may be automatically loaded into an SAP® system 810 using BC sets as created from the at least one questionnaire, as illustrated in FIG. 10. In addition, business configuration set files may be displayed automatically 815, for example as illustrated by text files in EXCEL® format in FIG. 11.

Thus, the model-driven software package configuration results in a software package that is pre-configured with final To-Be configuration requirements with a large amount of relevant enterprise data.

Figure 12:
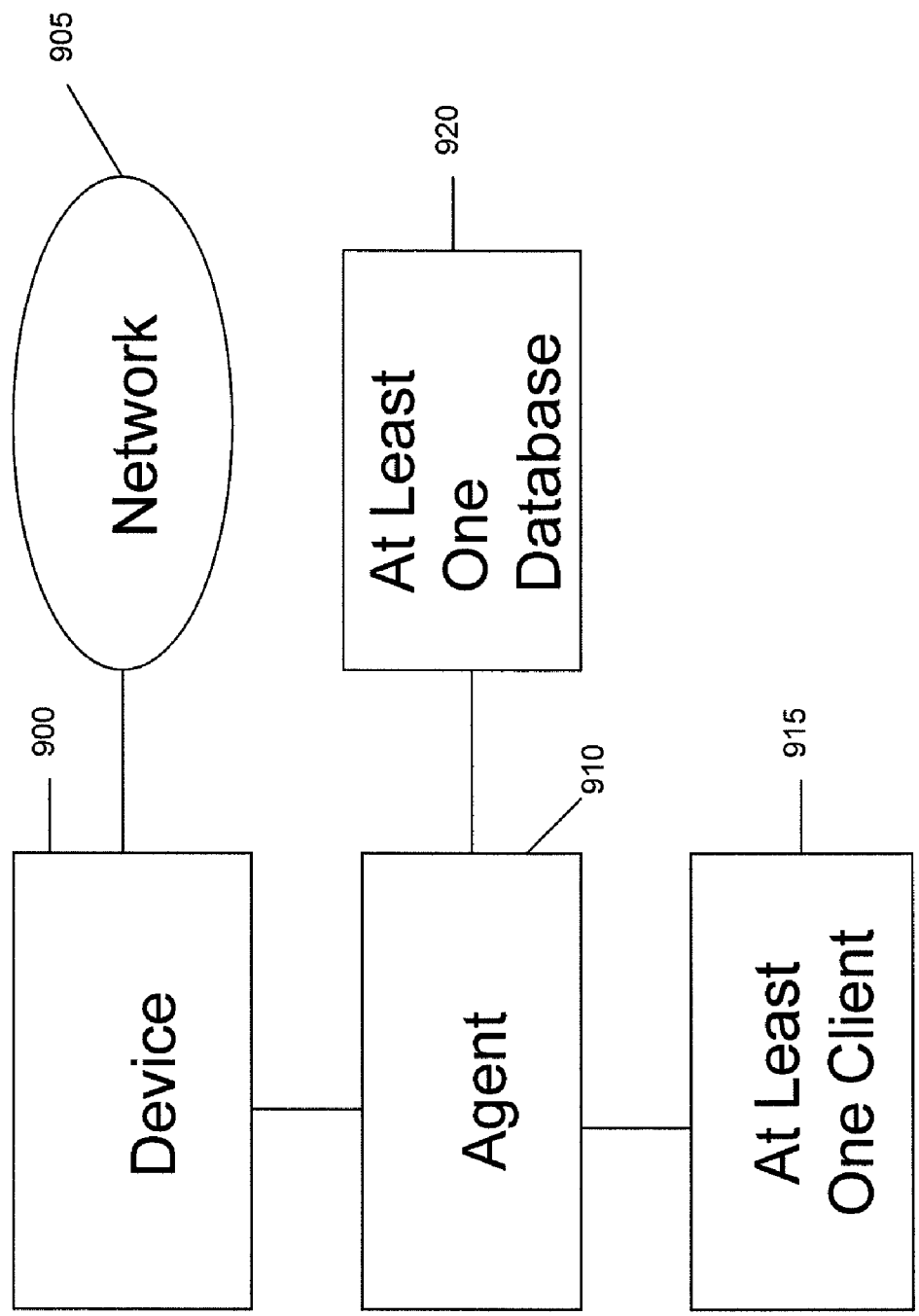
FIG. 12 is a block diagram showing an illustrative system of the invention.

FIG. 12 is a block diagram showing an illustrative system of the invention. The illustrative system includes at least one electronic or digital device 900 (e.g., a personal computer, cellular telephone, personal digital assistant or PDA, game device, MP3 player, television). The at least one device 900 may be connected to a network 905 (e.g., the internet, World Wide Web, intranet, local area network (LAN), wide area network (WAN)).

In embodiments, the system includes an agent 910 for configuring a software application package; at least one client 915; and at least one database 920 for storing a meta-model, associated mapping tables, and instance models. The agent 910 and at least one client 915 may be applications residing on the at least one electronic or digital device. The illustrative system is but one example, and one of ordinary skill in the art would recognize that many other variations may exist, all of which are contemplated by the invention.

Figure 13:
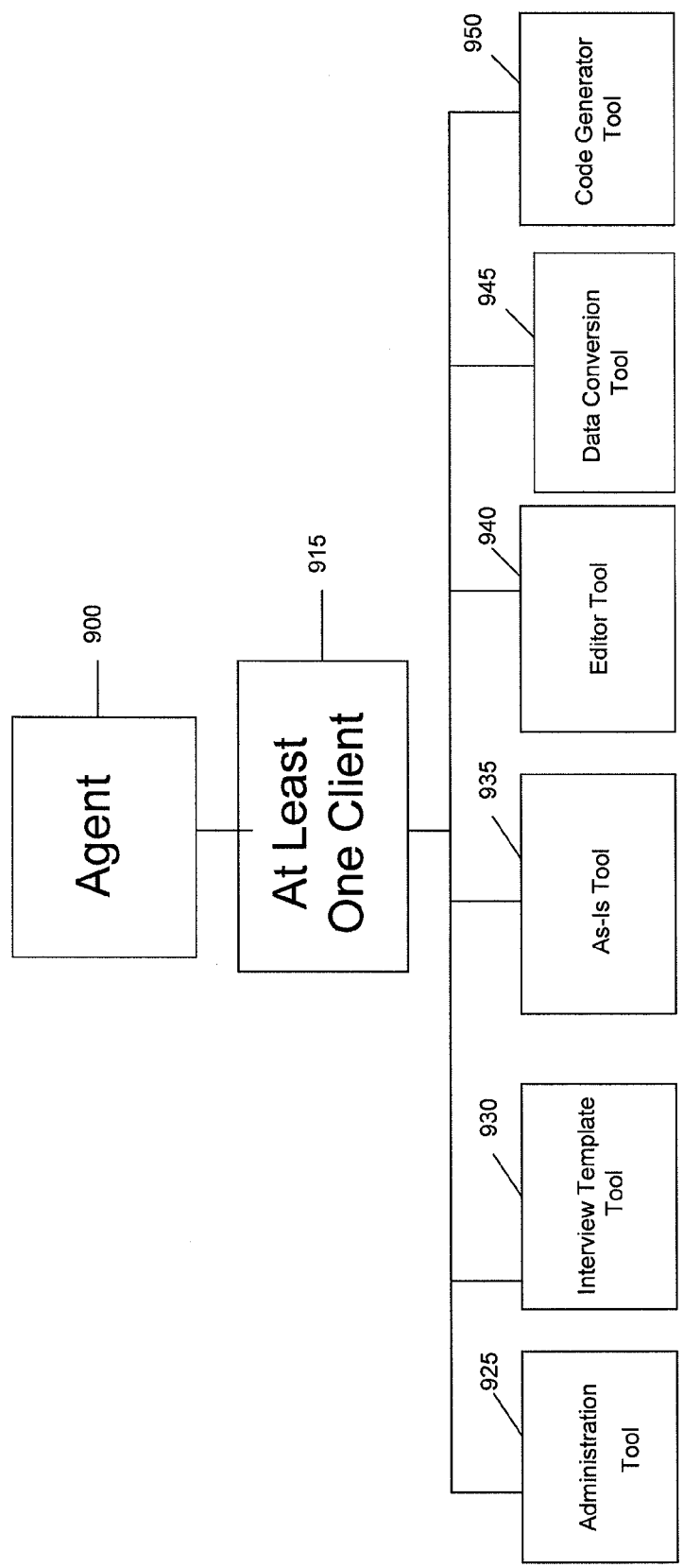
FIG. 13 illustrates an exemplary agent of the invention.
Figure 14:
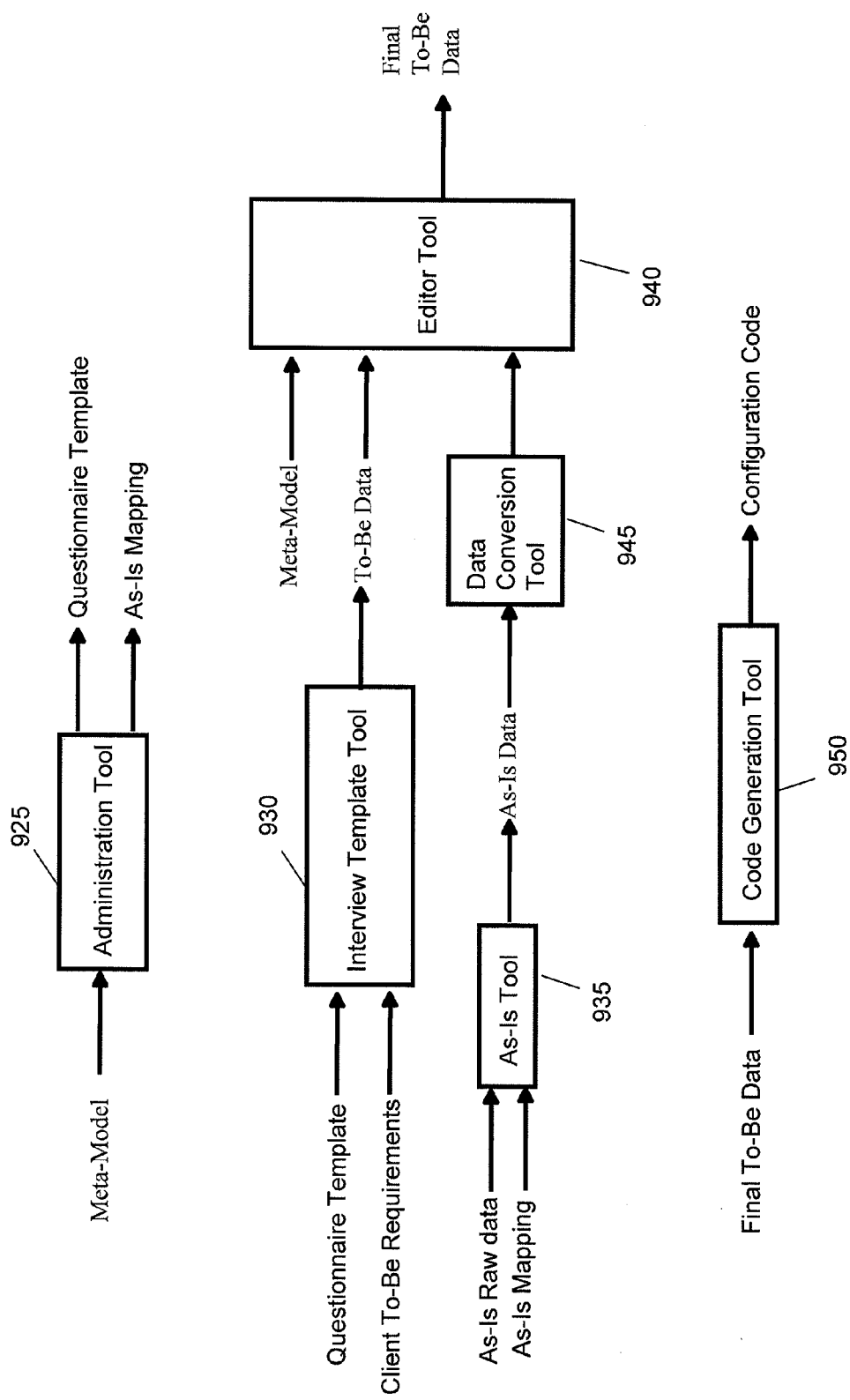
FIG. 14 illustrates how As-Is and To-Be data are processed by the agent of FIG. 13.

FIG. 13 illustrates an exemplary agent 910 of the invention. FIG. 14 illustrates how As-Is and To-Be Data may be processed by the agent 910.

The agent 910 includes at least one client 915 comprising at least one of: (1) an administration tool 925 for creating a questionnaire template and As-Is mapping information using a meta-model; (2) an interview template tool 930 to obtain To-Be data by gathering client To-Be requirements using a questionnaire template in a structured and machine-readable format; (3) an As-Is tool 935 (e.g., SAP® or IBM® Surveyors; IBM® Workbench) to gather As-Is raw data (for example, in IMG format) and As-Is mapping information; (4) an editor and display tool 940 to provide visual representation of at least one of To-Be configuration data or As-Is data for review, comparison, and manipulation; (5) a data conversion tool 945 to convert As-Is data to To-Be data; or (6) a code generator tool 950 to create the configuration code for the final To-Be requirements preferred by the user, or any combination thereof. The As-Is tool 935 may convert or reformat As-Is raw data to a different format (As-Is data) for a vendor-specific software package. In embodiments, the As-Is tool, data conversion tool, and code generator tool may be SAP®-specific tools. The at least one client may be a stand alone client installed on a desktop or laptop computer.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of at least one general purpose computer, special purpose computer(s), or other programmable data processing apparatus to produce a machine, such that the instructions, which execute via the processor of the computer or other programmable data processing apparatus, create means for implementing the functions specified in the flowcharts or block diagrams.

The exemplary and alternative embodiments described above may be combined in a variety of ways with each other. Furthermore, the steps and number of the various steps illustrated in the figures may be adjusted from that shown.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

The invention claimed is:

1. A method for configuring a software package for an enterprise, comprising:
   creating and populating a meta-model to describe an enterprise;
   gathering desired configuration requirements for the software package through at least one questionnaire;
   gathering current configuration raw data for the enterprise;
   displaying the desired configuration requirements and the configuration raw data in a graphical user interface;
   comparing the desired configuration requirements and the configuration raw data against the meta-model;
   highlighting differences between the desired configuration requirements and the configuration raw data in the graphical user interface;
   updating the desired configuration requirements by changing answers in the at least one questionnaire; and
   generating and executing configuration code for the software package to pre-configure the software package with the updated desired configuration requirements, wherein generating the configuration code comprises dragging and dropping at least one node from the updated desired configuration requirements into a hierarchy structure of the software package.

2. A method according to claim 1, wherein the metal-model comprises at least one of data, information, organization models, facts, relationships, or metrics used to describe the enterprise and its functions.

3. A method according to claim 1, further comprising creating a questionnaire template using the meta-model.

4. A method according to claim 3, further comprising creating the at least one questionnaire using the questionnaire template.

5. A method according to claim 1, wherein the at least one questionnaire comprise questions directed to a geographic, legal or administrative organization of an enterprise.

6. A method according to claim 1, wherein the at least one questionnaire comprise questions directed to a financial organization of the enterprise.

7. A method according to claim 1, wherein the at least one questionnaire comprise questions directed to a logistical organization of the enterprise.

8. A method according to claim 1, wherein the method is platform independent until said configuration code is generated and executed for a particular platform.

9. A method according to claim 1, wherein said generation and execution of configuration code is automatic.

10. A method according to claim 1, wherein the generation of configuration code comprises dragging and dropping at least one node from the desired configuration requirements into a hierarchy structure of the software package to generate a Business Configuration Set.

11. A method according to claim 1, further comprising reformatting configuration raw data to a different format for a vendor-specific software package.

12. A method according to claim 1, comprising displaying the desired configuration requirements and configuration raw data graphically.

13. A computer program product, comprising:
   a non-transitory computer usable medium having a computer readable program, wherein the computer readable program when executed on a computer causes the computer to:
   create and populate a meta-model to describe an enterprise;
   gather desired configuration requirements for a software package through at least one questionnaire;
   gather current configuration raw data for the enterprise;
   display the desired configuration requirements and the configuration raw data in a graphical user interface;
   compare the desired configuration requirements and the configuration raw data against the meta-model;
   highlight differences between the desired configuration requirements and the configuration raw data in the graphical user interface;
   update the desired configuration requirements by changing answers in the at least one questionnaire; and
   generate and execute configuration code for the software package to pre-configure the software package with the updated desired configuration requirements, wherein generate the configuration code includes dragging and dropping at least one node from the updated desired configuration requirements into a hierarchy structure of the software package.

* * * * *